US008316347B2

(12) United States Patent
Arsanjani et al.

(10) Patent No.: US 8,316,347 B2
(45) Date of Patent: Nov. 20, 2012

(54) ARCHITECTURE VIEW GENERATION METHOD AND SYSTEM

(75) Inventors: Ali P. Arsanjani, Fairfield, IA (US); Ahamed Jalaldeen, Karnataka (IN); Siddharth Purohit, Allen, TX (US)

(73) Assignee: International Business Machines Corporation, Armonk, NY (US)

( * ) Notice: Subject to any disclaimer, the term of this patent is extended or adjusted under 35 U.S.C. 154(b) by 837 days.

(21) Appl. No.: 12/328,827

(22) Filed: Dec. 5, 2008

(65) Prior Publication Data

US 2010/0146479 A1 Jun. 10, 2010

(51) Int. Cl.
*G06F 9/44* (2006.01)
(52) U.S. Cl. ........................................ 717/105; 717/100
(58) Field of Classification Search .................... 717/105
See application file for complete search history.

(56) References Cited

U.S. PATENT DOCUMENTS

| | | | |
|---|---|---|---|
| 6,779,172 B1 | 8/2004 | Weerawarana et al. | |
| 6,804,682 B1 | 10/2004 | Kemper et al. | |
| 6,865,593 B1 | 3/2005 | Reshef et al. | |
| 7,370,318 B1 | 5/2008 | Howe et al. | |
| 7,373,596 B2 * | 5/2008 | Hu et al. | 715/239 |
| 8,224,869 B2 | 7/2012 | Jalaldeen | |
| 2002/0104068 A1* | 8/2002 | Barrett et al. | 717/104 |
| 2004/0093381 A1* | 5/2004 | Hodges et al. | 709/204 |
| 2004/0249645 A1* | 12/2004 | Hauser et al. | 705/1 |
| 2005/0108684 A1* | 5/2005 | Sohn et al. | 717/120 |
| 2005/0137836 A1* | 6/2005 | Clark et al. | 703/1 |
| 2005/0144226 A1* | 6/2005 | Purewal | 709/203 |
| 2005/0262188 A1* | 11/2005 | Mamou et al. | 709/203 |
| 2006/0026506 A1* | 2/2006 | Kristiansen et al. | 715/517 |
| 2006/0069717 A1* | 3/2006 | Mamou et al. | 709/203 |
| 2006/0156277 A1* | 7/2006 | Gupta et al. | 717/104 |
| 2006/0167665 A1 | 7/2006 | Ata | |
| 2006/0242195 A1* | 10/2006 | Bove et al. | 707/103 R |
| 2007/0203740 A1* | 8/2007 | Abu El Ata et al. | 705/1 |

(Continued)

FOREIGN PATENT DOCUMENTS

WO WO2005048066 A2 5/2005

OTHER PUBLICATIONS

Portier, SOA Terminaology Overview, Part1: Service, architecture, Governance, and Business Terms, IBM Developer Works (Nov. 15, 2006), retrieved from http://www.ibm.com/developerworks/webservices/library/ws-soa-term1/ on May 12, 2012.*

(Continued)

*Primary Examiner* — Don Wong
*Assistant Examiner* — Theodore Hebert
(74) *Attorney, Agent, or Firm* — Schmeiser, Olsen & Watts; John Pivnichny

(57) ABSTRACT

An SOA solution architecture generation method and system. The method includes retrieving by a computing system, a service model and an SOA solution architecture model. The computing system retrieves and loads a configuration file comprising mapping data. The mapping data comprises data associating elements of the service model to architectural layers of the SOA solution. Each element is processed. The computing system identifies each architectural layer that corresponds to an associated element based on the mapping data. Each element is placed in an associated layer of the architectural layers. The computing system generates a UML model. The UML model comprises each element in an associated layer of the architectural layers. The computing system loads the UML model.

20 Claims, 15 Drawing Sheets

U.S. PATENT DOCUMENTS

| | | | |
|---|---|---|---|
| 2007/0204007 A1* | 8/2007 | Ashaari et al. | 709/217 |
| 2008/0004927 A1* | 1/2008 | Haller et al. | 705/7 |
| 2008/0021753 A1* | 1/2008 | Cummins | 705/8 |
| 2008/0022257 A1* | 1/2008 | Baartman et al. | 717/106 |
| 2008/0028084 A1* | 1/2008 | Bloching et al. | 709/229 |
| 2008/0028365 A1* | 1/2008 | Erl | 717/105 |
| 2008/0052664 A1* | 2/2008 | Batabyal | 717/104 |
| 2008/0065466 A1* | 3/2008 | Liu et al. | 705/10 |
| 2008/0091513 A1 | 4/2008 | Waggoner | |
| 2008/0127047 A1 | 5/2008 | Zhang et al. | |
| 2008/0155397 A1* | 6/2008 | Bissonnette et al. | 715/256 |
| 2008/0172574 A1* | 7/2008 | Fisher | 714/25 |
| 2008/0177887 A1* | 7/2008 | Theilmann | 709/229 |
| 2008/0183850 A1* | 7/2008 | Basu et al. | 709/223 |
| 2008/0282219 A1* | 11/2008 | Seetharaman et al. | 717/101 |
| 2009/0024561 A1* | 1/2009 | Palanisamy | 707/1 |
| 2009/0049025 A1* | 2/2009 | Fay et al. | 707/4 |
| 2009/0049040 A1* | 2/2009 | Fay et al. | 707/5 |
| 2009/0064205 A1* | 3/2009 | Fay et al. | 719/329 |
| 2009/0112668 A1* | 4/2009 | Abu El Ata | 705/7 |
| 2009/0182750 A1* | 7/2009 | Keyes et al. | 707/10 |
| 2010/0017783 A1* | 1/2010 | Brininstool et al. | 717/101 |
| 2010/0030890 A1* | 2/2010 | Dutta et al. | 709/224 |
| 2010/0037201 A1* | 2/2010 | Salle et al. | 717/104 |
| 2010/0153464 A1 | 6/2010 | Jalaldeen | |
| 2010/0153914 A1 | 6/2010 | Arsanjani et al. | |
| 2012/0203743 A1 | 8/2012 | Jalaldeen | |

OTHER PUBLICATIONS

Roa, Using UML Service Components to Represent the SOA Architecture Pattern, IBM Developer Works (Jun. 19, 2007), retrieved from http://www.ibm.com/developerworks/architecture/library/ar-logsoa/ on May 12, 2012.*

Falleri et al.; Towards a Traceability Framework for Model Fransformations in Kermeta; 10 pages; In ECMDA-TW'06: ECMDA Traceability Workshop, Sintef ICT, Norway; (2006); pp. 31-40.

Vanhooff et al.; Traceability as Input for Model Transformations; 10 pages; European conference on model driven architecture foundations and applications ECMDA 2007 (2007); pp. 37-46.

VanBaelen et al.; Traceability Management Toolset; ITEA—Information Technology for European Advancement; MARTES Model-Based Approach for Real-Time Embedded Systems Development; Sep. 20, 2007; 28 pages.

Office Action (Mail Date Jul. 11, 2011) for U.S. Appl. No. 12/335,686, filed Dec. 16, 2008.

Notice of Allowance (Mail Date Mar. 9, 2012) for U.S. Appl. No. 12/335,686, filed Dec. 16, 2008.

U.S. Appl. No. 13/448,893, filed Apr. 17, 2012.

Kavianpour, Mansour; SOA and Large Scale and complex Enterprise Transformation; ICSOC '07 Proceedings of the 5th International Conference on Service-Oriented Computing, 2007, pp. 530-545.

Zhang, et al.; Refactoring Middleware with Aspects; IEEE Transactions on Parallel and Distributed Systems, Vol. 14, No. 11; Nov. 2003; pp. 1058-1073.

DiPenta, Massimiliano; Evolution Doctor: a Framework to Control Software System Evolution; Proceedings of the Ninth European Conference on Software Maintenance and Reengineering; Mar. 21-23, 2005; pp. 1-4.

Notice of Allowance (Mail Date Aug. 1, 2012) for U.S. Appl. No. 12/332,504; filed Dec. 11, 2008; Confirmation No. 4600.

* cited by examiner

ARCHITECTURE VIEW GENERATION METHOD AND SYSTEM

FIELD OF THE INVENTION

The present invention relates to a method and associated system for generating an architectural view of service oriented architecture solutions.

BACKGROUND OF THE INVENTION

Modifying various components of a system typically comprises an inefficient process with little flexibility. Accordingly, there exists a need in the art to overcome at least some of the deficiencies and limitations described herein above.

SUMMARY OF THE INVENTION

The present invention provides a method comprising:
retrieving, by a computing system, a service model;
retrieving, by said computing system, an SOA solution architecture model;
retrieving, by said computing system, a configuration file comprising mapping data,
wherein said mapping data comprises data associating elements of said service model to architectural layers of said SOA solution architecture model;
loading, by said computing system, said configuration file;
processing, by said computing system, each element of said elements;
identifying, by said computing system, layers of said architectural layers that correspond to associated elements of said elements of said service model, wherein said identifying is based on said mapping data, wherein said layers of said architectural layers are represented as unified modeling language (UML) packages;
associating, by said computing system, each layer of said layers with an associated UML package of said UML packages;
placing, by said computing system, each said element in an associated layer of said architectural layers;
generating, by said computing system in response to said placing, a UML model, wherein said UML model comprises each said element in an associated layer of said architectural layers;
loading, by said computing system, said UML model; and
executing, by said computing system, said UML model.

The present invention provides a computing system a processor coupled to a computer-readable memory unit, said memory unit comprising instructions that when executed by the processor implements a unified modeling language (UML) model generation method, said method comprising:
retrieving, by a computing system, a service model;
retrieving, by said computing system, an SOA solution architecture model;
retrieving, by said computing system, a configuration file comprising mapping data,
wherein said mapping data comprises data associating elements of said service model to architectural layers of said SOA solution architecture model;
loading, by said computing system, said configuration file;
processing, by said computing system, each element of said elements;
identifying, by said computing system, layers of said architectural layers that correspond to associated elements of said elements of said service model, wherein said identifying is based on said mapping data, wherein said layers of said architectural layers are represented as unified modeling language (UML) packages;
associating, by said computing system, each layer of said layers with an associated UML package of said UML packages;
placing, by said computing system, each said element in an associated layer of said architectural layers;
generating, by said computing system in response to said placing, a UML model, wherein said UML model comprises each said element in an associated layer of said architectural layers;
loading, by said computing system, said UML model; and
executing, by said computing system, said UML model.

The present invention advantageously provides a simple method and associated system capable of modifying various components of a system.

BRIEF DESCRIPTION OF THE DRAWINGS

FIG. 10 which includes

FIG. 11 which includes

DETAILED DESCRIPTION OF THE INVENTION

Figure 1:
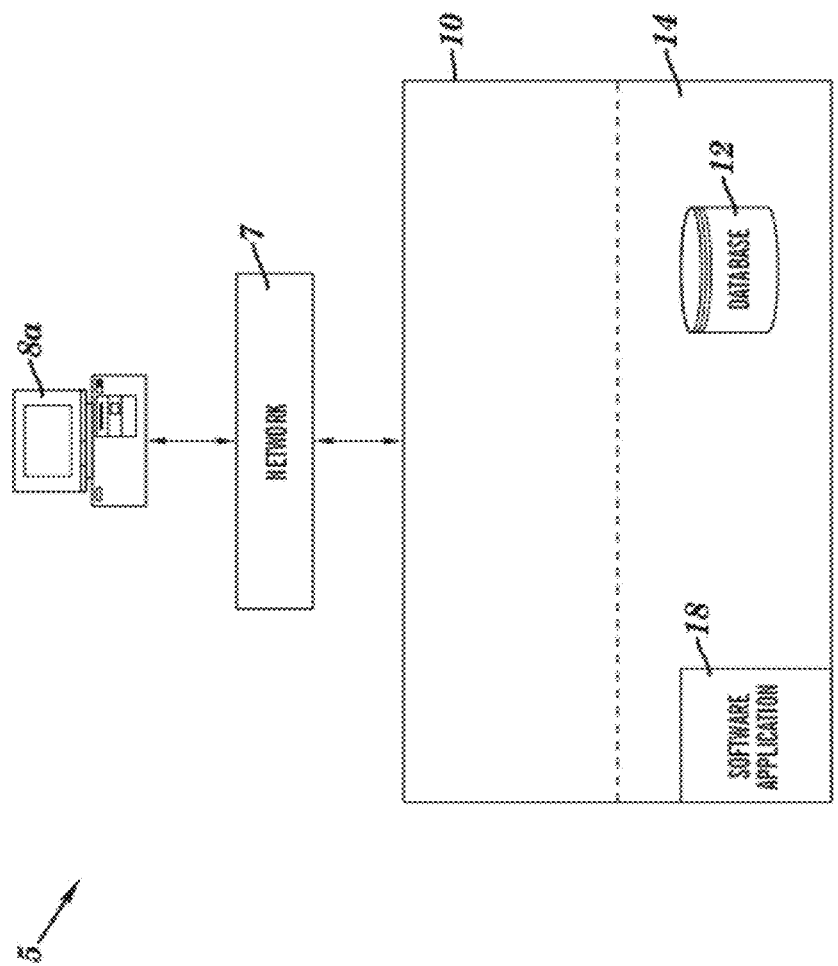
FIG. 1 illustrates a system for generating an architectural view of service oriented architecture (SOA) solutions, in accordance with embodiments of the present invention.

FIG. 1 illustrates a system 5 for generating an architectural view of a service oriented architecture (SOA) solution, in accordance with embodiments of the present invention. SOA comprises enterprise scale IT architecture for providing IT agility to support business agility. An architectural view of SOA solution comprises a structural, modularity, and essential components of the SOA solution. System 5 of FIG. 1 comprises a computing apparatus 8*a* connected to a computing system 10 through a network 7. Network 7 may comprise any type of network including, inter alia, a local area network, (LAN), a wide area network (WAN), the Internet, etc. Computing apparatus 8*a* may comprise any type of computing apparatus including, inter alia, a personal computer, a laptop computer, a computer terminal, etc. Computing apparatus 8*a* may comprise a single computing apparatus or a plurality of computing apparatuses. Computing apparatus 8*a* is used by end users for communicating with (e.g., entering data) computing system 10. Computing system 10 may comprise any type of computing system(s) including, inter alia, a personal computer (PC), a server computer, a database computer, etc. Computing system 10 is used to retrieve data from computing apparatus 8*a* for generating an architectural view of SOA solutions. Computing system 10 comprises a memory system 14. Memory system 14 may comprise a single memory system. Alternatively, memory system 14 may comprise a plurality of memory systems. Memory system 14 comprises a software application 18 and a database 12. Database 12 comprises all retrieved data (i.e., retrieved from computing apparatus 8*a*) and any generated data (e.g., service models, configuration files, SOA solution architecture models, etc).

Figure 6:
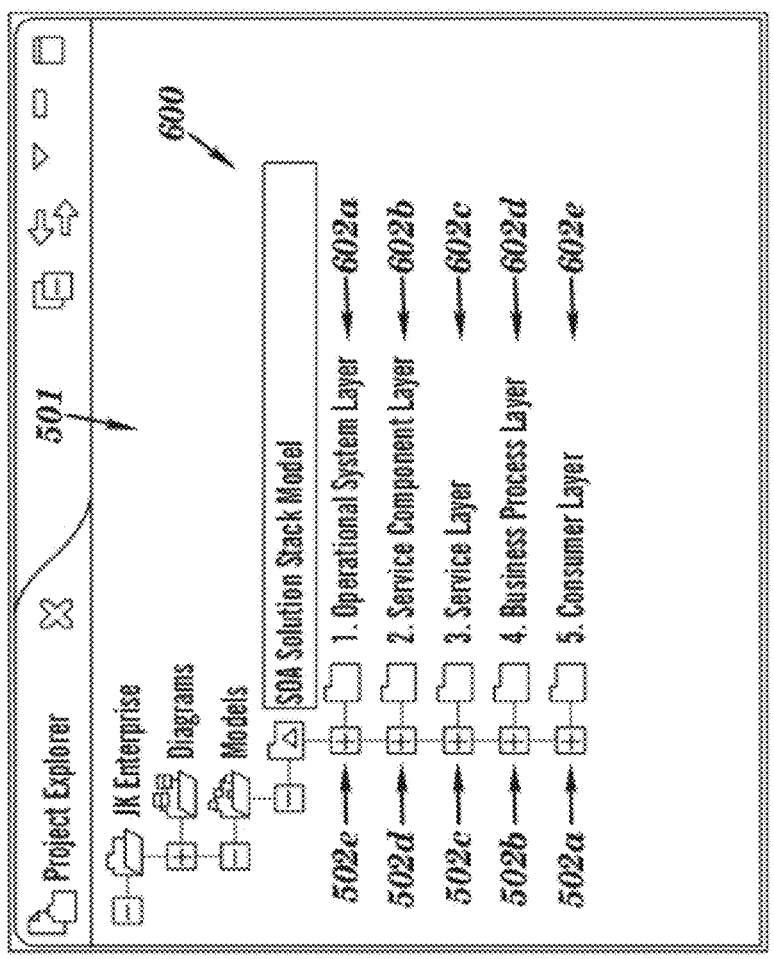
FIG. 6 illustrates a UML representation of SOA solution architecture, in accordance with embodiments of the present invention.
Figure 7:
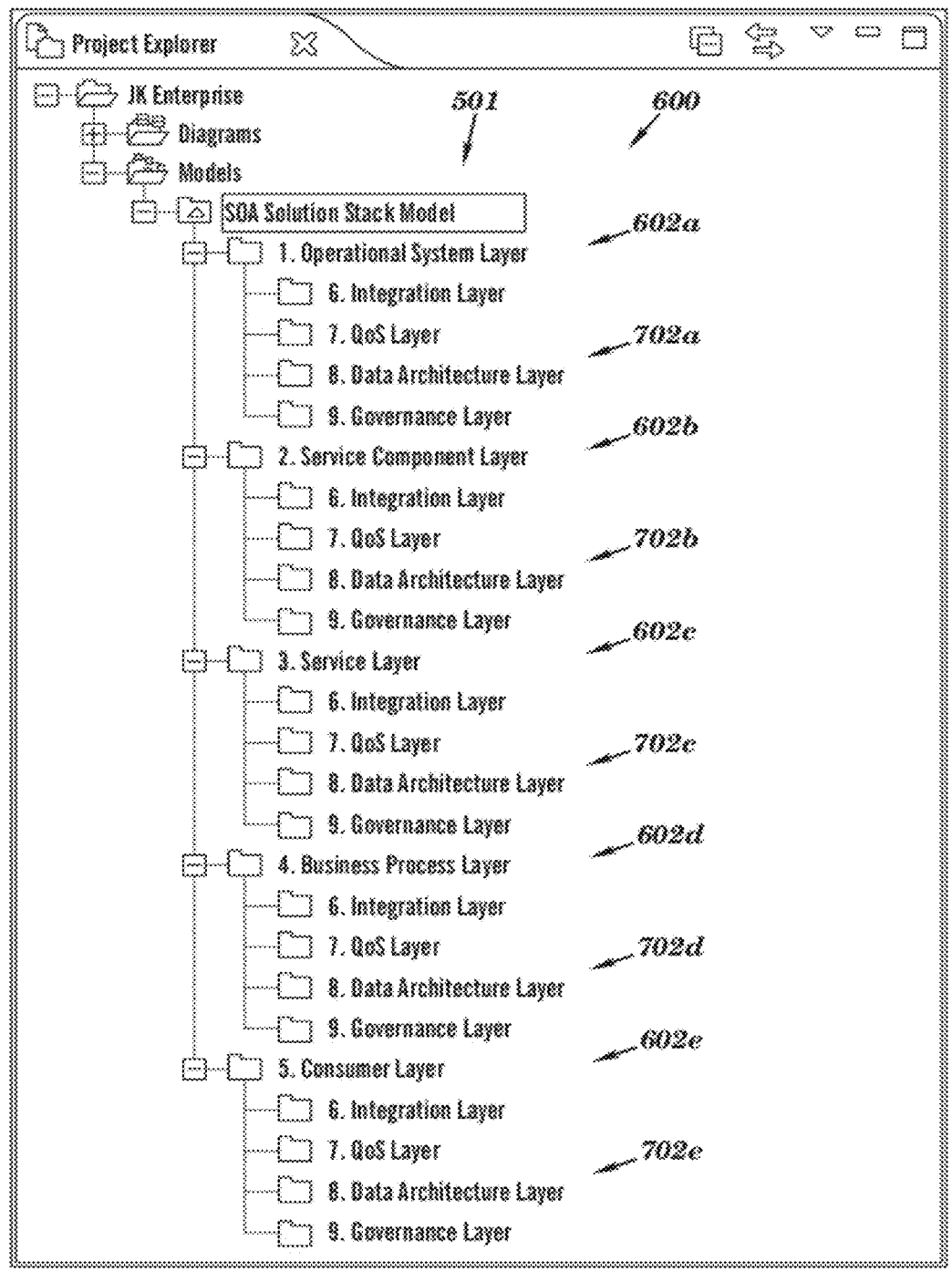
FIG. 7 illustrates an expanded version of UML packages, in accordance with embodiments of the present invention.
Figure 9:
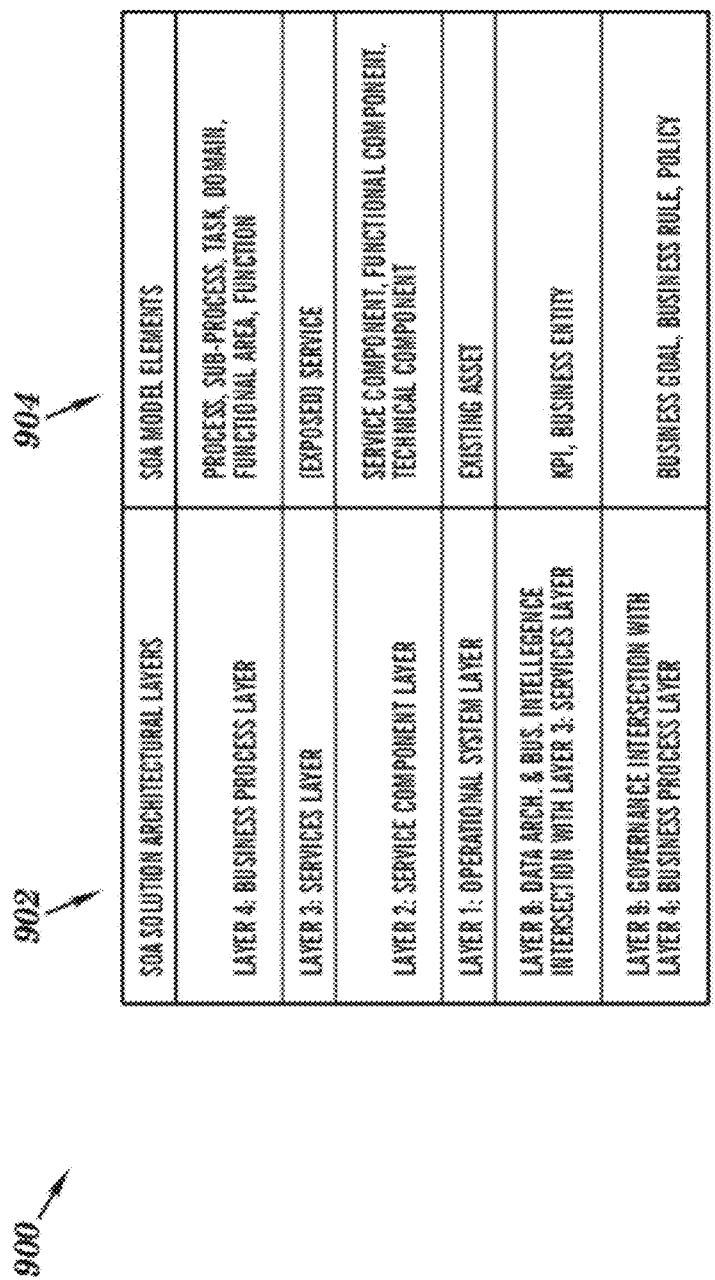
FIG. 9 illustrates a configuration file, in accordance with embodiments of the present invention.

Software application 18 performs the following functions associated with an automated process for constructing the architectural view of SOA solutions from a service model:

1. Software application 18 generates a unified modeling language (UML) model template. UML is a standardized general-purpose modeling language in the field of software engineering. UML includes a set of graphical notation techniques to create abstract models of specific systems (i.e., referred to as a UML model). The UML model template (i.e., as illustrated in FIGS. 6 and 7 as described, infra) is used to represent SOA solution architecture (i.e., a nine layered architectural view of SOA solutions used as an input for operational modeling and deployment units) in UML based SOA modeling tools. Operational modeling defines a distribution of an IT system's components onto geographically distributed nodes. Additionally, operational modeling defines connections necessary to support required component interactions in order to achieve the IT system's functional and non-functional requirements within the constraints of technology, skills, and budget. The UML model template comprises UML packages corresponding to layers of SOA solution architecture. The layers (i.e., horizontal layers) are represented as five UML packages (e.g., as illustrated in FIG. 6). The remaining four cross-cutting layers are represented as sub-packages inside the UML packages corresponding to horizontal layers (e.g., as illustrated in FIG. 7).
2. Software application 18 performs a mapping process between SOA model elements and a UML package corresponding to a layer of SOA solution architecture (e.g., as illustrated in FIG. 9). The mapping process is externalized in a configuration file for ease of modifications and enhancements.
3. Software application 18 executes an algorithm to construct architectural view of SOA solution from a service model (as illustrated in FIG. 10). The algorithm may be implemented in manual or automated manner. The algorithm is illustrated as a flow chart in FIG. 12.
4. Software application 18 implements the algorithm of FIG. 11 as a model-to-model transformation in a UML based SOA modeling tool. A model to model transformation comprises a process for converting a first model to a second model in a same system.

The following steps illustrate an implementation example for generating an architectural view of an SOA solution:

1. An SOA Architect has completed a service modeling process (as illustrated in FIG. 10, supra) in a UML based SOA modeling tool using a service model template.
2. The SOA Architect configures and invokes the service model to an SOA Solution architecture model transformation.
3. During a first time invocation, a SOA solution architecture model (as illustrated in FIG. 7, supra) is generated programmatically.
4. A configuration file (i.e., comprising mapping data for mapping between SOA model elements and architectural layers (as illustrated in FIG. 9, supra)) is loaded and mapping details are initialized.
5. A service model (as illustrated in FIG. 10, supra) comprises the following example SOA model elements.
  A. A business goal—"Reduce Cost".
  B. A KPI—"by 10% in FY2008".
  C. A domain—"Business Administration".
  D. A functional area—"Account Administration".
  E. A fraction (i.e., business capability)—"Account Management".
  F. A process—"Manage Accounts".
  G. Three sub—processes—"Open Account", "Reinstate Account", and "Verify Account".
  H. Two business entities—"Account" and "Customer".
  I. A rule type—"Accounting Rules".
  J. Business rules—"Transfer Limit".
  K. Two existing assets—"Banling App" and "CICS".
  L. A service hierarchy (Service Group)—"Account Administration".
  M. Three candidate services—"Open Account", "Reinstate Account", and "Verify Account".
  N. Two exposed services—"Open Account" and "Verify Account".
  O. A subsystem—"Account Administration".
  P. A service component—"Account Administration".
  Q. A functional component—"Account Management".
  R. A technical component—"Legacy System Connector".
6. For each of the above listed example SOA model elements, a corresponding layer in the SOA solution architecture is identified from the mapping data (as illustrated in FIG. 9, supra). The corresponding layers are associated as follows:
  A. A business goal—"Reduce Cost": Layer 9 intersection with Layer 4.
  B. A KPI—"By 10% in FY2008": Layer 8 intersection with Layer 3.
  C. A domain—"Business Administration": Layer 4.
  D. A functional area—"Account Administration": Layer 4.
  E. A function (i.e., business capability)—"Account Management": Layer 4.
  F. A process—"Manage Accounts": Layer 4.
  G. Three sub-processes—"Open Account", "Reinstate Account", and "Verify Account": Layer 4.
  H. Two business entities—"Account" and "Customer": Layer 8 intersection with Layer 3.
  I. A rule type—"Accounting Rules": Ignored.
  J. Business rules—"Transfer Limit": Layer 9 intersection with Layer 4.
  K. Two existing assets—"Banking App" and "CICS": Layer 1.
  L. A service hierarchy (service group)—"Account Administration": Ignored.
  M. Three candidate services—"Open Account", "Reinstate Account", and "Verify Account" Ignored.
  N. Two exposed services—"Open Account" and "Verify Account": Layer 3.

O. A subsystem—"Account Administration": Ignored.
P. A service component—"Account Administration": Layer 2.
Q. A functional component—"Account Management": Layer 2.
R. A technical component—"Legacy System Connector": Layer 2.

7. Each SOA model element is generated in a corresponding layer as identified.
8. A modified SOA Solution Architecture Model (UML Model) is loaded to the tool.
9. The SOA architect leverages the generated SOA solution architecture model for operational modeling, deployment units, and other downstream activities.

Figure 2:
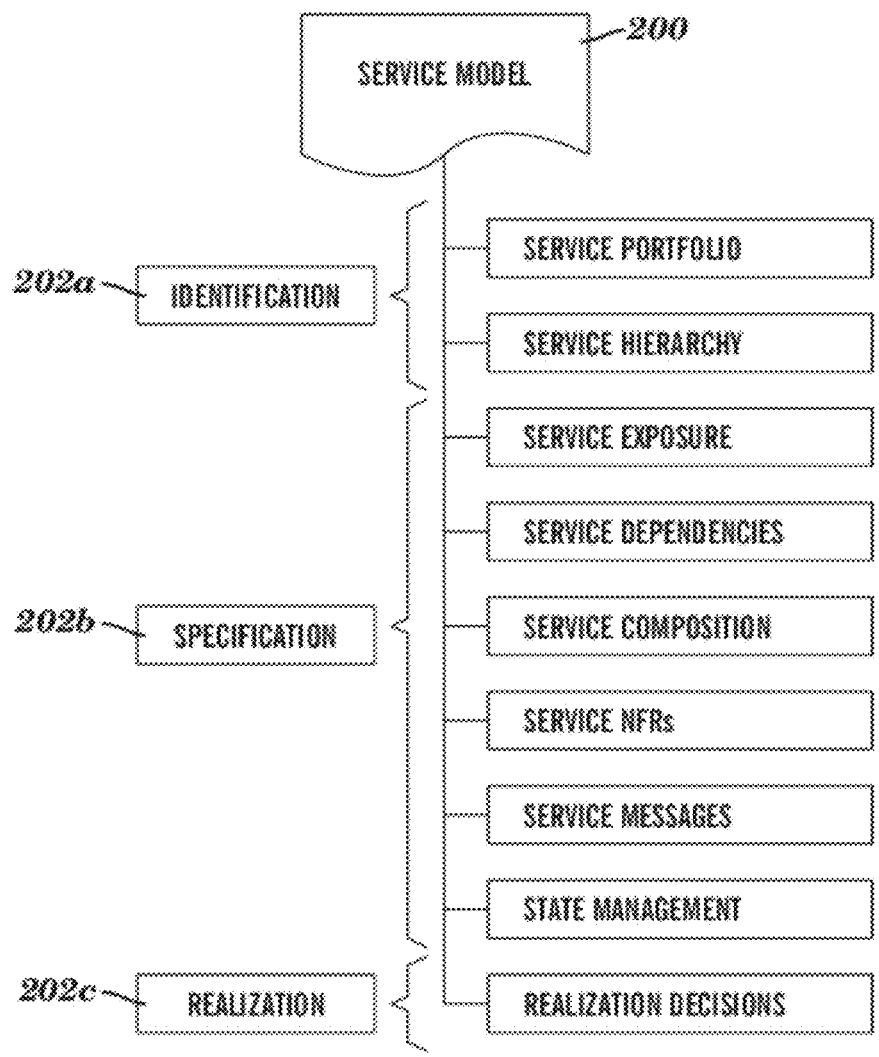
FIG. 2 illustrates a service model, in accordance with embodiments of the present invention.

FIG. 2 illustrates a service model 200, in accordance with embodiments of the present invention. Service model 200 in FIG. 2 comprises a graphical representation of a service model. An outcome of SOA activities are grouped under three major categories:
1. Identification 202*a*.
2. Specification 202*b*.
3. Realization 202*c*.

The three categories correspond to three phases of service oriented modeling and architecture (SOMA) methodology. SOMA is an end to end SOA development method aimed at enabling target business processes through the identification, specification, realization, implementation, and deployment of business-aligned services that form a service oriented architecture (SOA) foundation.

Figure 3:
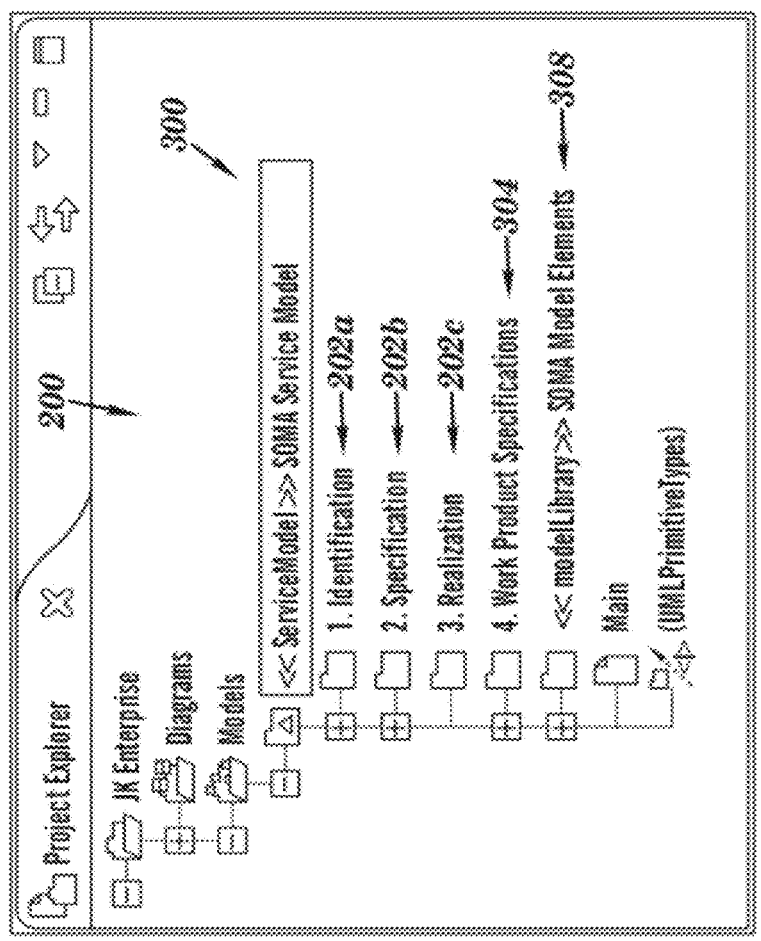
FIG. 3 illustrates a UML representation of a service model, in accordance with embodiments of the present invention.

FIG. 3 illustrates a UML representation 300 of service model 200 of FIG. 2, in accordance with embodiments of the present invention. A UML model with a service model stereotype is an outer most container. UML model 200 comprises UML packages corresponding to the three phases of SOMA methodology:
1. Identification 202*a*.
2. Specification 202*b*.
3. Realization 202*c*.

Work product specifications package 304 is used to annotate a dynamic content of various work products that may be generated. SOMA model elements package comprises various SOA model elements that may be used in this service model.

Figure 4:
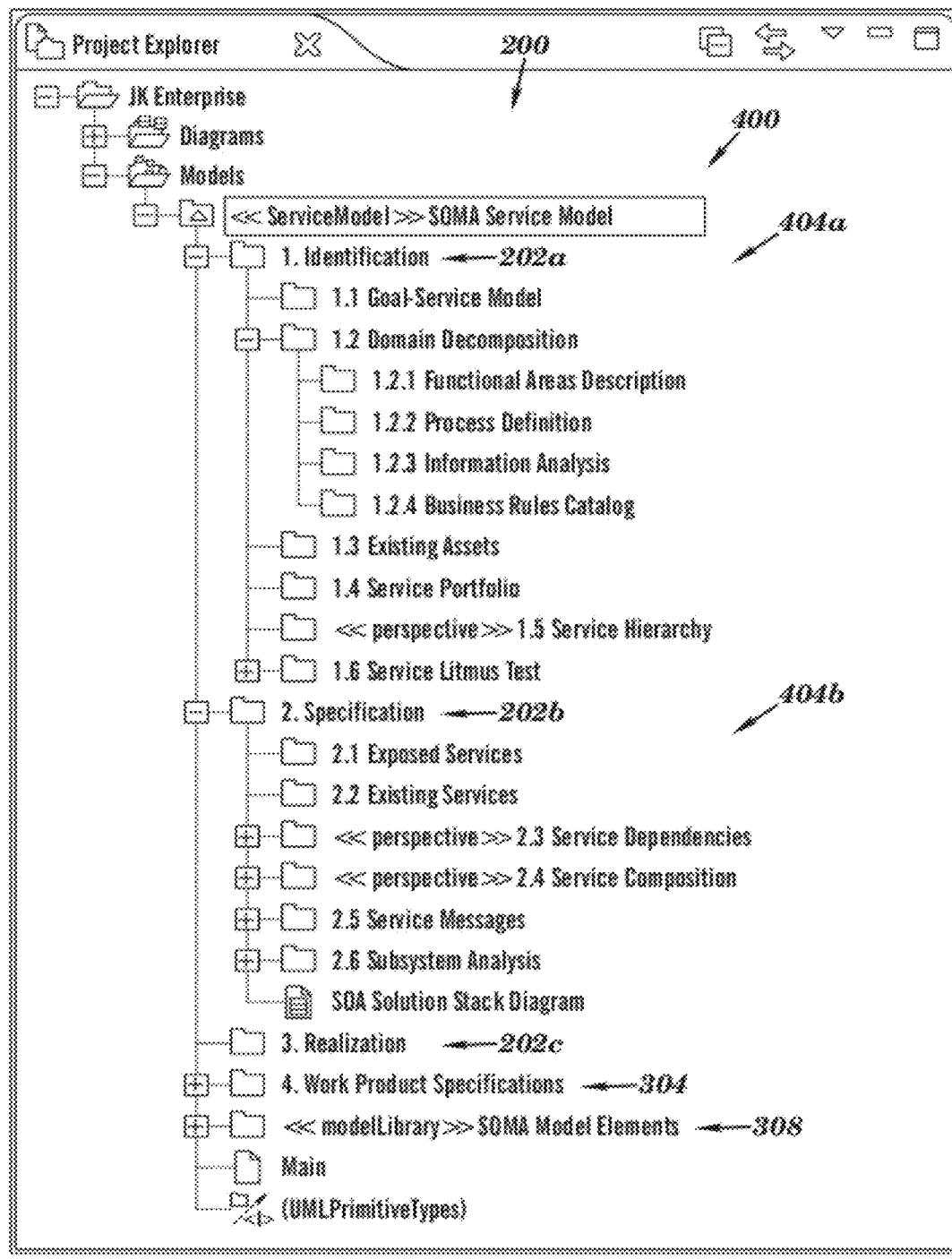
FIG. 4 illustrates a UML representation of a service model comprising sub-packages, in accordance with embodiments of the present invention.

FIG. 4 illustrates a UML representation 400 of service model 200 of FIG. 2 comprising sub-packages 404*a* and 404*b*, in accordance with embodiments of the present invention. Sub-package 404*a* has been expanded from UML package identification 202*a*. Sub-package 404*b* has been expanded from UML package specification 202*b*.

Figure 5:
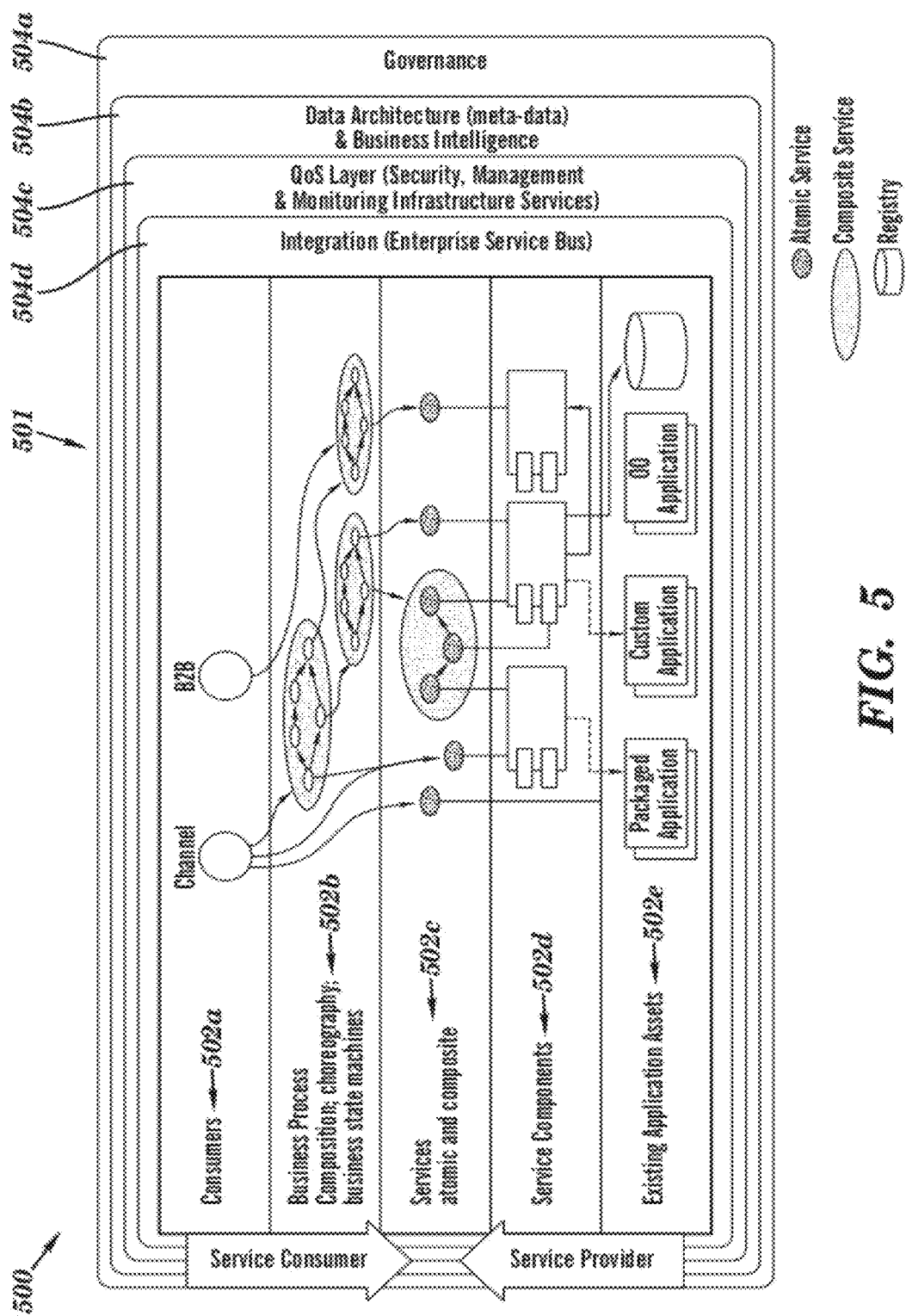
FIG. 5 illustrates a graphical representation of SOA solution architecture, in accordance with embodiments of the present invention.

FIG. 5 illustrates a graphical representation 500 of SOA solution architecture 501, in accordance with embodiments of the present invention. Graphical representation 500 of SOA solution architecture 501 comprises 5 horizontal layers:
1. Consumers Layer 502*a*.
2. Business Process Layer 502*b*.
3. Services Layer 502*c*.
4. Service components Layer 502*d*.
5. Operational System Layer 502*e*.

Graphical representation 500 of SOA solution architecture 501 comprises 4 cross-cutting layers:
1. Governance Layer 504*a*.
2. Data architecture Layer 504*b*.
3. QoS layer Layer 504*c*.
4. Integration Layer 504*d*.

SOA model elements may be placed on associated layers.

FIG. 6 illustrates a UML representation 600 of SOA solution architecture 501 of FIG. 5, in accordance with embodiments of the present invention. UML package 602*a* represents an operational system layer (e.g., existing application assets 502*e* layer of FIG. 5). UML package 602*b* represents service components 502*d* layer of FIG. 5. UML package 602*c* represents service 502*c* layer of FIG. 5. UML package 602*d* represents business process 502*b* layer of FIG. 5. UML package 602*e* represents consumer 502*a* layer of FIG. 5.

FIG. 7 illustrates an expanded version of UML packages 602*a* . . . 602*e* of FIG. 6, in accordance with embodiments of the present invention. Sub-package 702*a* has been expanded from UML package 602*a*. Sub-package 702*b* has been expanded from UML package 602*b*. Sub-package 702*c* has been expanded from UML package 602*c*. Sub-package 702*d* has been expanded from UML package 602*d*. Sub-package 702*e* has been expanded from UML package 602*e*.

Figure 8:
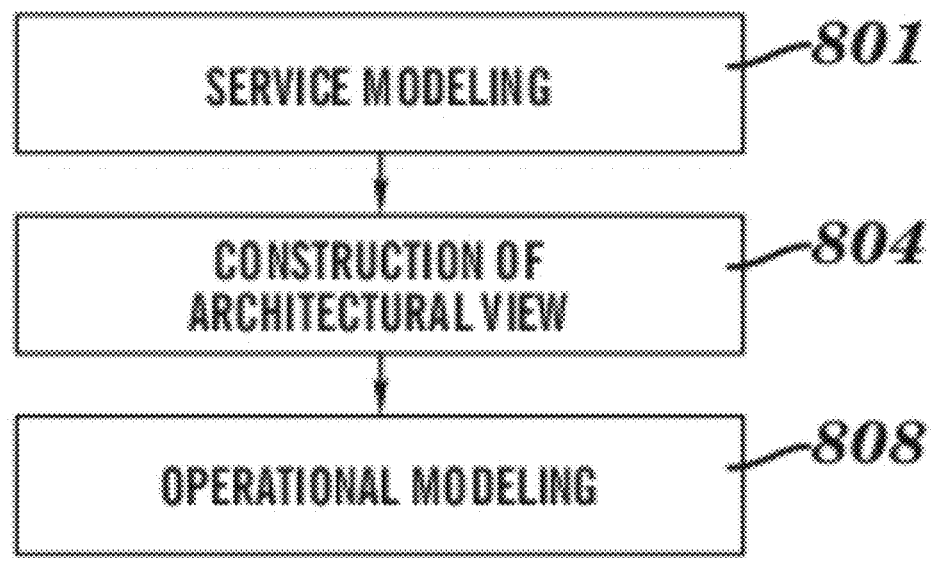
FIG. 8 illustrates a flowchart describing an algorithm describing a flow of activities in an SOA project, in accordance with embodiments of the present invention.

FIG. 8 illustrates a flowchart describing an algorithm describing a flow of activities in an SOA project, in accordance with embodiments of the present invention. In step 801, an SOA architect starts with a service modeling process. In step 804, the SOA architect generates an architectural view of an SOA solution. In step 808, the SOA architect uses the architectural view from step 804 for an operational modeling process.

FIG. 9 illustrates a configuration file 900, in accordance with embodiments of the present invention. Configuration file 900 comprises mapping data for mapping SOA model elements 904 to SOA solution architectural layers 902.

Figure 10A:
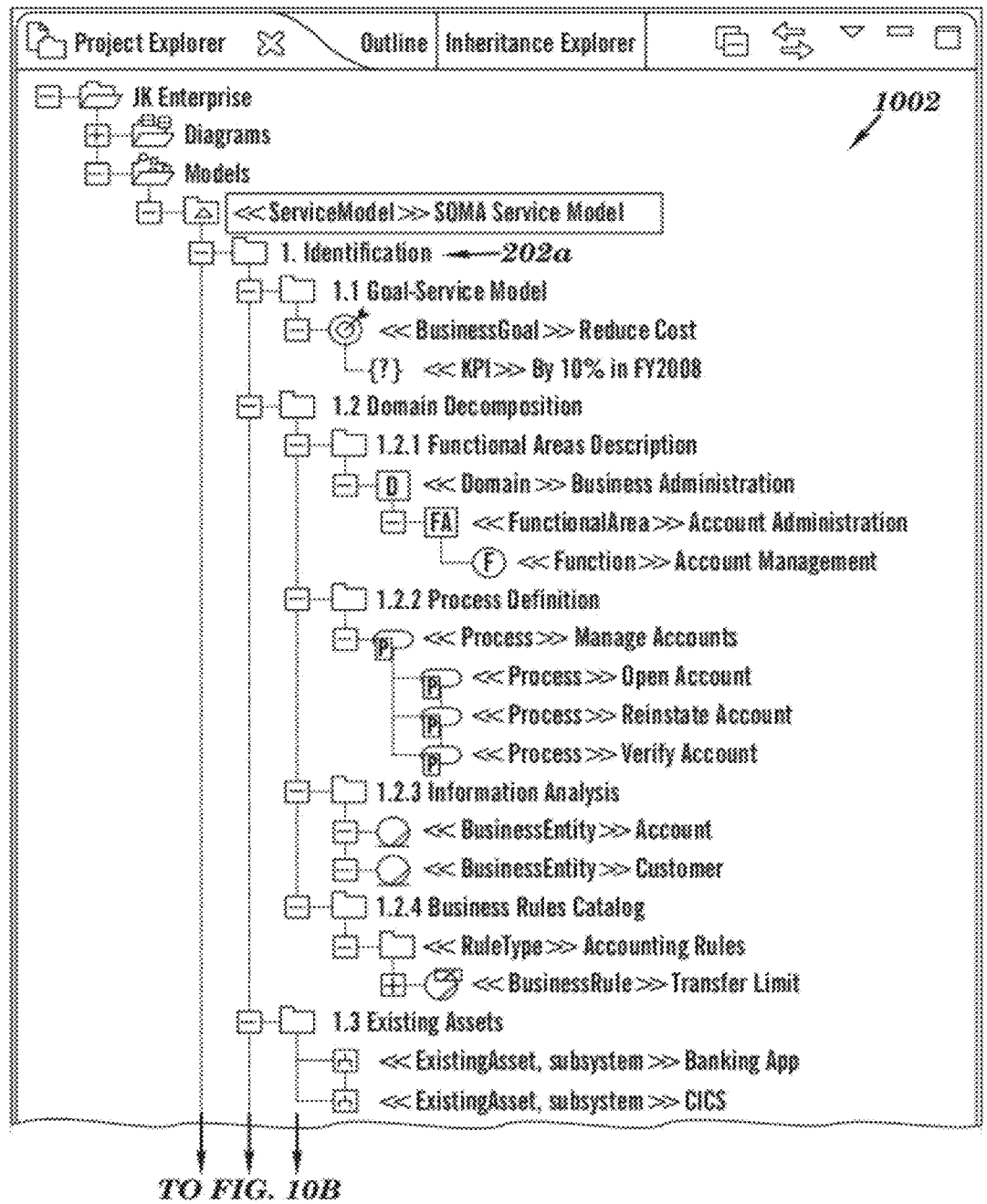
FIGS. 10A and 10B illustrates an example of a service model with SOA model elements derived from a UML representation of a service model, in accordance with embodiments of the present invention.
Figure 10B:
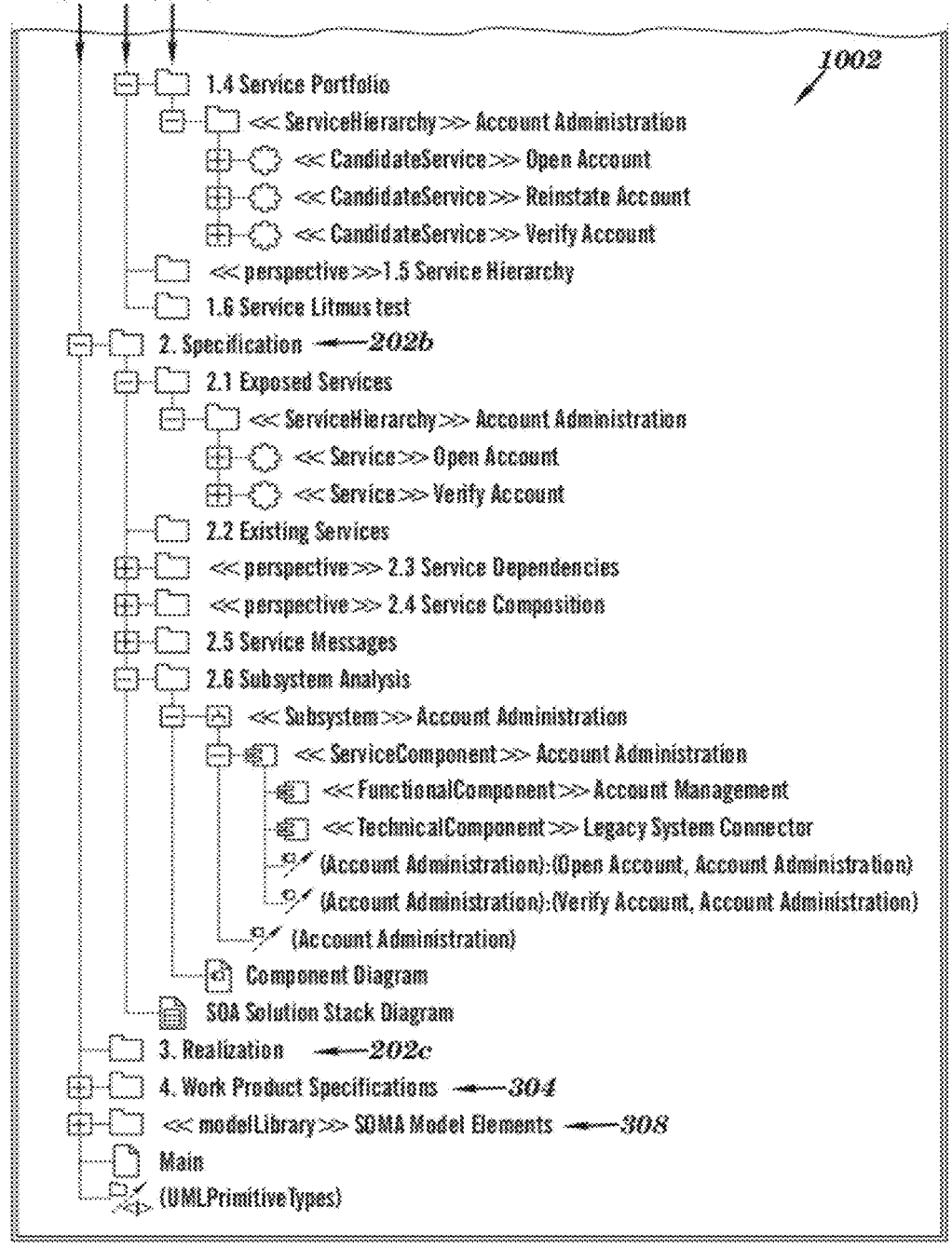

FIG. 10 which includes FIGS. 10A and 10B illustrates an example of a service model 1002 derived from UML representation 300 of a service model in FIG. 3, in accordance with embodiments of the present invention. Service model 1002 comprises SOA service elements or UML packages 202*a* . . . 202*c*. Service model 1002 is used as a source model for the model to model transformation.

Figure 11A:
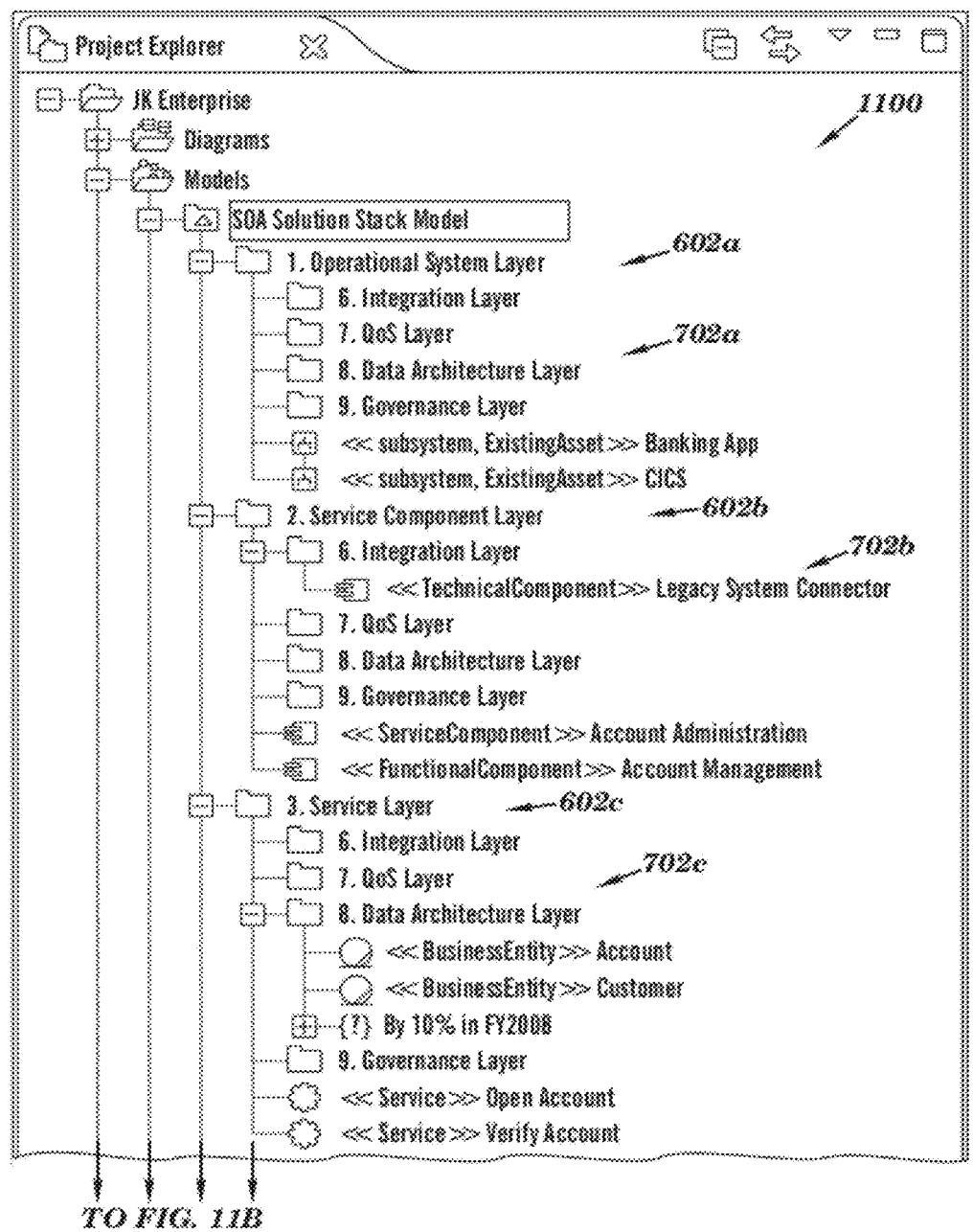
FIGS. 11A and 11B illustrates an example of an SOA solution architecture model with generated SOA model elements, in accordance with embodiments of the present invention.
Figure 11B:
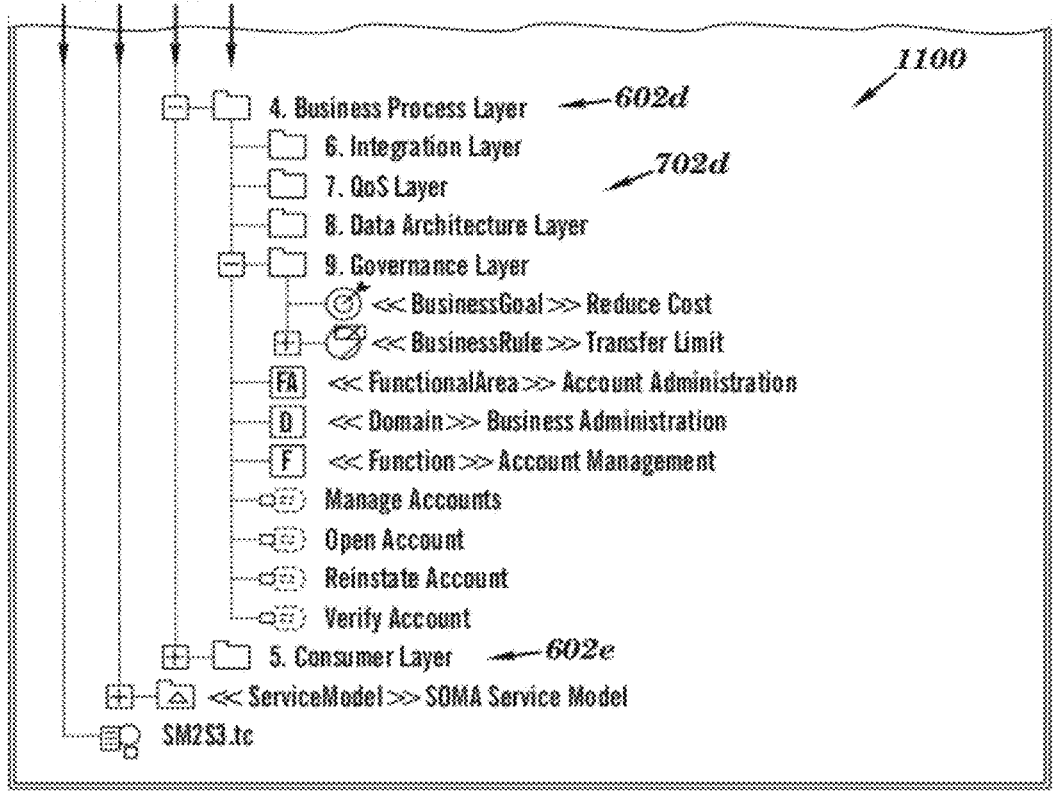

FIG. 11 which includes FIGS. 11A and 11B illustrates an example of an SOA solution architecture model 1100 with generated SOA model elements, in accordance with embodiments of the present invention. SOA solution architecture model 1100 is a target model of the model to model transformation.

Figure 12:
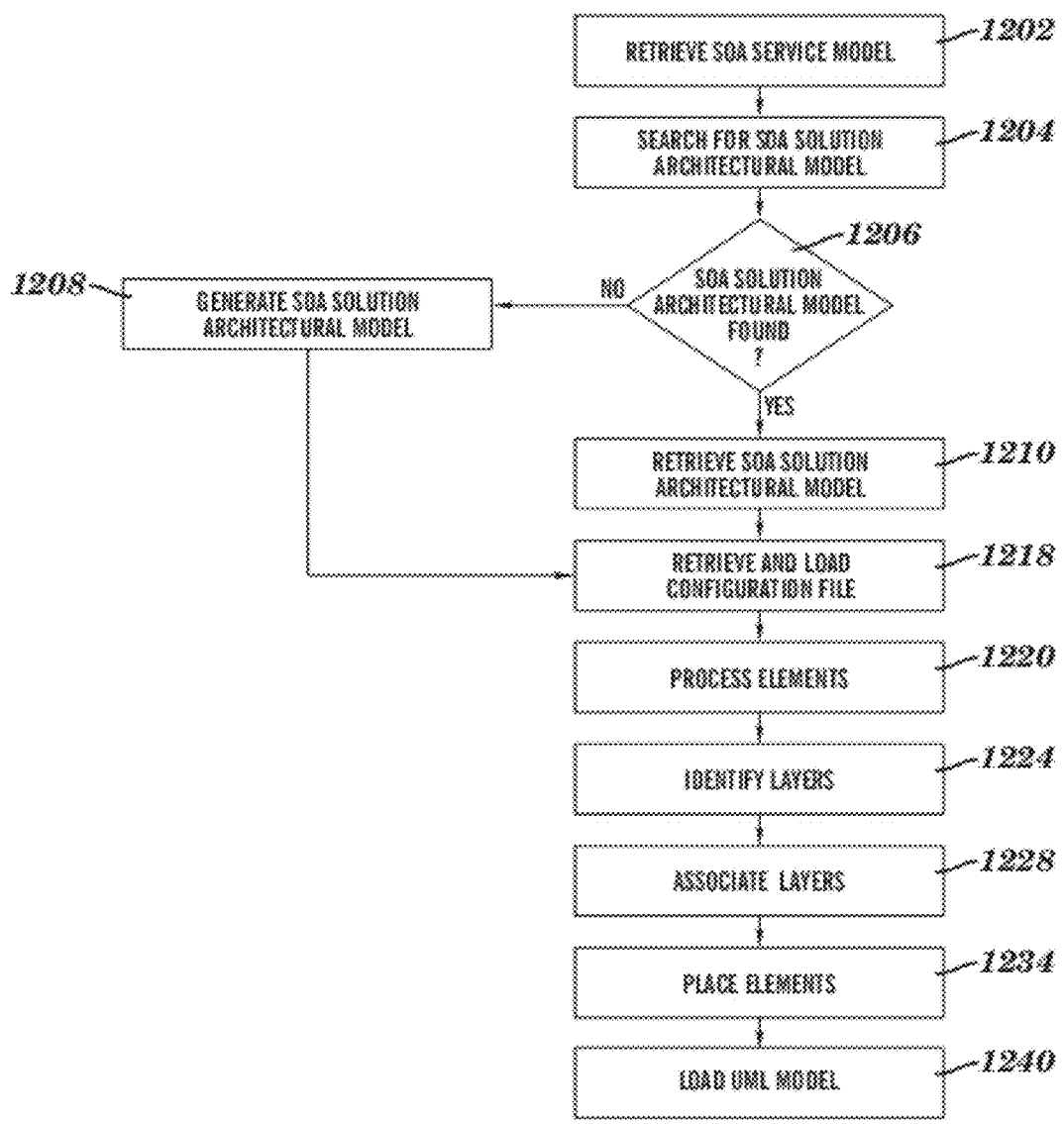
FIG. 12 illustrates a flowchart describing an algorithm used by the system of FIG. 1 for generating an architectural view of an SOA solution, in accordance with embodiments of the present invention.

FIG. 12 illustrates a flowchart describing an algorithm used by system 5 of FIG. 1 for generating an architectural view of SOA solution, in accordance with embodiments of the present invention. In step 1202, a computing system (e.g., computing system 5 of FIG. 1) retrieves a service model. In step 1204, the computing system searches for an (existing) SOA solution architecture model. In step 1206, it is determined if an SOA solution architecture model has been located. If in step 1206, it is determined that an SOA solution architecture model has been located then in step 1210, the SOA solution architecture model is retrieved. If in step 1206, it is determined that an SOA solution architecture model has not been located then in step 1208, an SOA solution architecture model is generated (i.e., using an SOA solution architecture model template. In step 1218, a configuration file (e.g., an XML file) is retrieved and loaded (e.g., a mapping process is initiated). The configuration file comprises mapping data. The mapping data comprises data associating elements of the service model to architectural layers of the SOA solution. In step 1220, the elements of the service model are processed. Processing may include retrieving every element for an identification process as described with reference to step 1224, infra. In step 1224, the computing system identifies layers of the architectural layers that correspond to associated elements of the elements from the service model. The identification process performed in step 1224 is based on the mapping data. The layers of the architectural layers are represented as unified modeling language (UML) packages. In step 1228, the computing system associates each layer with an associated UML package of the UML packages. In step 1234, the computing system places each element in an associated layer of the architectural layers. In step 1240, the computing system loads the UML model.

Figure 13:
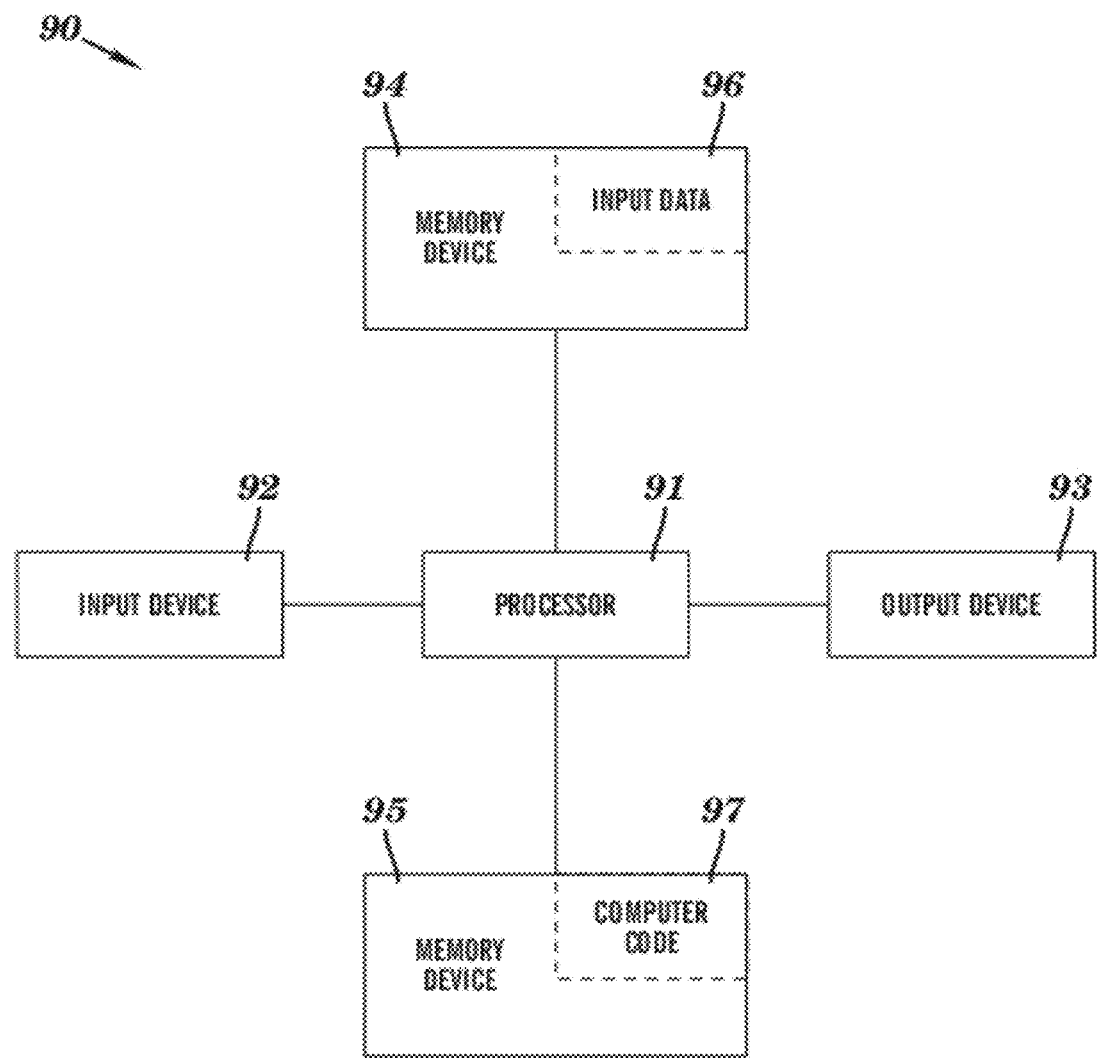
FIG. 13 illustrates a computer apparatus used for generating an architectural view of an SOA solution, in accordance with embodiments of the present invention.

FIG. 13 illustrates a computer apparatus 90 (e.g., computing system 10 of FIG. 1) used for generating an architectural view of an SOA solution, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a software application, a mouse, etc. The output device 93 may be, inter alia, a printer, a plotter, a computer screen, a magnetic tape, a removable hard disk, a floppy disk, a software application, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 12) for generating an architectural view of an SOA solution. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 13) may comprise the algorithm of FIG. 12 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be created, integrated, hosted, maintained, deployed, managed, serviced, etc. by a service provider who offers to generate an architectural view of SOA solution. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for generating an architectural view of an SOA solution. In another embodiment, the invention provides a business method that performs the process steps of the invention on a subscription, advertising, and/or fee basis. That is, a service provider, such as a Solution Integrator, could offer to generate an architectural view of an SOA solution. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 13 shows the computer system 90 as a particular configuration of hardware and software, any configuration of hardware and software, as would be known to a person of ordinary skill in the art, may be utilized for the purposes stated supra in conjunction with the particular computer system 90 of FIG. 13. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method comprising:

retrieving, by a computing system, a service model;

retrieving, by said computing system, an SOA solution architecture model;

generating, by said computing system, a graphical representation of said SOA solution architecture model, wherein said graphical representation of said SOA solution architecture model comprises horizontal layers and cross-cutting layers, wherein said horizontal layers comprise a consumers layer, a business process layer, a services layer, a service component layer, and an operation system layer, and wherein said cross-cutting layers comprise a governance layer, a data architecture layer, a QoS layer, and an integration layer;

retrieving, by said computing system, a configuration file comprising mapping data, wherein said mapping data comprises data associating elements of said service model to architectural layers of said SOA solution architecture model, wherein said architectural layers are comprised by said horizontal layers and said cross-cutting layers, wherein said elements comprise a process/subprocess element, a domain element, an exposed service element, a service/functional/technical component element, an existing asset element, a business entity element, a business goal element, and a policy element, and wherein said architectural layers comprise an operation system layer, a service component layer, a services layer, a business process layer, a data architecture and business intelligent layer, and a governance layer;

loading, by said computing system, said configuration file;

processing, by said computing system, each element of said elements;

identifying, by said computing system, layers of said architectural layers that correspond to associated elements of said elements of said service model, wherein said identifying is based on said mapping data, wherein said layers of said architectural layers are represented as unified modeling language (UML) packages;

associating, by said computing system, each layer of said layers with an associated UML package of said UML packages;

placing, by said computing system, each said element in an associated layer of said architectural layers;

generating, by said computing system in response to said placing, a UML model, wherein said UML model comprises each said element in an associated layer of said architectural layers;

generating, by said computing system, a graphical representation of said UML model, wherein said graphical representation of said UML model comprises a representation of said UML packages and associated expanded sub-packages, and wherein said associated expanded sub-packages are associated with said cross-cutting layers;

loading, by said computing system, said UML model;

executing, by said computing system, said UML model;

generating, by said computing system, a graphical representation of a first service model derived from said UML model, wherein said first service model comprises an identification package, a specification package, a realization package, and a work product specification package, wherein said identification package comprises a goal-service model, a domain decomposition, a process definition, an information analysis, a business rules catalog, existing assets, and a service portfolio, and wherein said specification package comprises exposed services, existing services, service messages, a subsystem analysis, and a stack diagram; and presenting, by said computing system via a computer monitor, said graphical representation of said first service model.

2. The method of claim 1, further comprising:

before said retrieving said SOA solution architecture model, locating by said computing system, said SOA solution architecture model, wherein said SOA solution architecture model comprises an existing SOA solution architecture model; and generating, by said computing system, an architectural view of an SOA solution associated with said SOA solution architecture model.

3. The method of claim 1, further comprising:

before said retrieving said SOA solution architecture model, determining, by said computing system, an absence of an existing SOA solution architecture model;

generating, by said computing system, said SOA solution architecture model; and generating, by said computing system, an architectural view of an SOA solution associated with said SOA solution architecture model.

4. The method of claim 1, further comprising:

generating, by said computing system, an instance of a UML model template.

5. The method of claim 1, wherein said processing comprises retrieving each said element for said identifying.

6. The method of claim 1, wherein said executing said UML model comprises leveraging said UML model for an operational modeling process.

7. The method of claim 1, further comprising:

generating, by said computing system, an architectural view of an SOA solution associated with said SOA solution architecture model; and presenting, by said computing system to a user, said architectural view of said SOA solution.

8. The method of claim 1, wherein said loading said configuration file comprises initializing a mapping process between said SOA model elements and said architectural layers.

9. The method of claim 1, wherein said configuration file comprises an XML file.

10. The method of claim 1, wherein said SOA solution architecture model is retrieved from a current project.

11. A process for supporting computer infrastructure, said process comprising providing at least one support service for at least one of creating, integrating, hosting, maintaining, and deploying computer-readable code in said computing system, wherein the code in combination with said computing system is capable of performing the method of claim 1.

12. A computing system comprising a processor coupled to a computer-readable memory unit, said memory unit comprising instructions that when executed by the processor implements a unified modeling language (UML) model generation method, said method comprising:

retrieving, by a computing system, a service model;

retrieving, by said computing system, an SOA solution architecture model;

generating, by said computing system, a graphical representation of said SOA solution architecture model, wherein said graphical representation of said SOA solution architecture model comprises horizontal layers and cross-cutting layers, wherein said horizontal layers comprise a consumers layer, a business process layer, a services layer, a service component layer, and an operation system layer, and wherein said cross-cutting layers comprise a governance layer, a data architecture layer, a QoS layer, and an integration layer;

retrieving, by said computing system, a configuration file comprising mapping data, wherein said mapping data comprises data associating elements of said service model to architectural layers of said SOA solution architecture model, wherein said architectural layers are comprised by said horizontal layers and said cross-cutting layers, wherein said elements comprise a process/subprocess element, a domain element, an exposed service element, a service/functional/technical component element, an existing asset element, a business entity element, a business goal element, and a policy element, and wherein said architectural layers comprise an operation system layer, a service component layer, a services layer, a business process layer, a data architecture and business intelligent layer, and a governance layer;

loading, by said computing system, said configuration file;

processing, by said computing system, each element of said elements;

identifying, by said computing system, layers of said architectural layers that correspond to associated elements of said elements of said service model, wherein said identifying is based on said mapping data, wherein said layers of said architectural layers are represented as unified modeling language (UML) packages;

associating, by said computing system, each layer of said layers with an associated UML package of said UML packages;

placing, by said computing system, each said element in an associated layer of said architectural layers;

generating, by said computing system in response to said placing, a UML model, wherein said UML model comprises each said element in an associated layer of said architectural layers;

generating, by said computing system, a graphical representation of said UML model, wherein said graphical representation of said UML model comprises a representation of said UML packages and associated expanded sub-packages, and wherein said associated expanded sub-packages are associated with said cross-cutting layers;

loading, by said computing system, said UML model;

executing, by said computing system, said UML model;

generating, by said computing system, a graphical representation of a first service model derived from said UML model, wherein said first service model comprises an identification package, a specification package, a realization package, and a work product specification package, wherein said identification package comprises a goal-service model, a domain decomposition, a process definition, an information analysis, a business rules catalog, existing assets, and a service portfolio, and wherein said specification package comprises exposed services, existing services, service messages, a subsystem analysis, and a stack diagram; and presenting, by said computing system via a computer monitor, said graphical representation of said first service model.

13. The computing system of claim 12, wherein said method further comprises:
    before said retrieving said SOA solution architecture model, locating by said computing system, said SOA solution architecture model, wherein said SOA solution architecture model comprises an existing SOA solution architecture model; and
    generating, by said computing system, an architectural view of an SOA solution associated with said SOA solution architecture model.

14. The computing system of claim 12, wherein said method further comprises:
    before said retrieving said SOA solution architecture model, determining, by said computing system, an absence of an existing SOA solution architecture model;
    generating, by said computing system, said SOA solution architecture model; and
    generating, by said computing system, an architectural view of an SOA solution associated with said SOA solution architecture model.

15. The computing system of claim 12, wherein said method further comprises:
    generating, by said computing system, an instance of a UML model template.

16. The computing system of claim 12, wherein said processing comprises retrieving each said element for said identifying.

17. The computing system of claim 12, wherein said executing said UML model comprises leveraging said UML model for an operational modeling process.

18. The computing system of claim 12, wherein said method further comprises:
    generating, by said computing system, an architectural view of an SOA solution associated with said SOA solution architecture model; and
    presenting, by said computing system to a user, said architectural view of said SOA solution.

19. The computing system of claim 12, wherein said loading said configuration file comprises initializing a mapping process between said SOA model elements and said architectural layers.

20. A computer program product, comprising a computer storage device storing a computer readable program code, said computer readable program code configured to perform a method of claim upon being executed by a processor of a computing system, said method comprising:
    retrieving, by a computing system, a service model;
    retrieving, by said computing system, an SOA solution architecture model;
    generating, by said computing system, a graphical representation of said SOA solution architecture model, wherein said graphical representation of said SOA solution architecture model comprises horizontal layers and cross-cutting layers, wherein said horizontal layers comprise a consumers layer, a business process layer, a services layer, a service component layer, and an operation system layer, and wherein said cross-cutting layers comprise a governance layer, a data architecture layer, a QoS layer, and an integration layer;
    retrieving, by said computing system, a configuration file comprising mapping data, wherein said mapping data comprises data associating elements of said service model to architectural layers of said SOA solution architecture model, wherein said architectural layers are comprised by said horizontal layers and said cross-cutting layers, wherein said elements comprise a process/subprocess element, a domain element, an exposed service element, a service/functional/technical component element, an existing asset element, a business entity element, a business goal element, and a policy element, and wherein said architectural layers comprise an operation system layer, a service component layer, a services layer, a business process layer, a data architecture and business intelligent layer, and a governance layer;
    loading, by said computing system, said configuration file;
    processing, by said computing system, each element of said elements;
    identifying, by said computing system, layers of said architectural layers that correspond to associated elements of said elements of said service model, wherein said identifying is based on said mapping data, wherein said layers of said architectural layers are represented as unified modeling language (UML) packages;
    associating, by said computing system, each layer of said layers with an associated UML package of said UML packages;
    placing, by said computing system, each said element in an associated layer of said architectural layers;
    generating, by said computing system in response to said placing, a UML model, wherein said UML model comprises each said element in an associated layer of said architectural layers;
    generating, by said computing system, a graphical representation of said UML model, wherein said graphical representation of said UML model comprises a representation of said UML packages and associated expanded sub-packages, and wherein said associated expanded sub-packages are associated with said cross-cutting layers;
    loading, by said computing system, said UML model;
    executing, by said computing system, said UML model;
    generating, by said computing system, a graphical representation of a first service model derived from said UML model, wherein said first service model comprises an identification package, a specification package, a realization package, and a work product specification package, wherein said identification package comprises a goal-service model, a domain decomposition, a process definition, an information analysis, a business rules catalog, existing assets, and a service portfolio, and wherein said specification package comprises exposed services, existing services, service messages, a subsystem analysis, and a stack diagram; and
    presenting, by said computing system via a computer monitor, said graphical representation of said first service model.

* * * * *